(12) United States Patent
Machuca et al.

(10) Patent No.: US 8,057,942 B2
(45) Date of Patent: Nov. 15, 2011

(54) ASSISTED STACK ANODE PURGE AT START-UP OF FUEL CELL SYSTEM

(75) Inventors: Joe C. Machuca, Rochester, NY (US); Charles Mackintosh, Victor, NY (US); Gary M. Robb, Honeoye Falls, NY (US); Steven G. Goebel, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1062 days.

(21) Appl. No.: 11/874,317

(22) Filed: Oct. 18, 2007

(65) Prior Publication Data

US 2009/0104480 A1 Apr. 23, 2009

(51) Int. Cl.
*H01M 8/04* (2006.01)
(52) U.S. Cl. .......................... 429/429; 429/444; 429/458
(58) Field of Classification Search .................. None
See application file for complete search history.

(56) References Cited

U.S. PATENT DOCUMENTS

| 5,013,617 | A | 5/1991 | Scheffler |
| 6,924,056 | B2 | 8/2005 | Whiton et al. |
| 7,041,405 | B2 | 5/2006 | Skiba et al. |
| 2005/0129999 | A1 | 6/2005 | Geschwindt et al. |
| 2005/0142399 | A1 | 6/2005 | Kulp et al. |
| 2006/0093879 | A1 | 5/2006 | Yang et al. |

*Primary Examiner* — Jonathan Crepeau
(74) *Attorney, Agent, or Firm* — Fraser Clemens Martin & Miller LLC; J. Douglas Miller

(57) ABSTRACT

A fuel cell system that enables an assisted anode purge upon start-up is provided. The fuel cell system includes a fuel cell stack having a plurality of fuel cells with anodes and cathodes. The fuel cell stack has an anode supply manifold and an anode exhaust manifold in fluid communication with the anodes. The fuel cell system further includes a suction device in fluid communication with at least one of the anode supply manifold and the anode exhaust manifold. The suction device adapted to selectively draw a partial vacuum on the fuel cell stack during a start-up of the fuel cell system. Methods for starting the fuel cell system are also provided.

10 Claims, 5 Drawing Sheets

ASSISTED STACK ANODE PURGE AT START-UP OF FUEL CELL SYSTEM

FIELD OF THE INVENTION

The present disclosure relates to a fuel cell system and, more particularly, to a start-up system and method for purging anodes of a fuel cell stack at start-up.

BACKGROUND OF THE INVENTION

A fuel cell has been proposed as a clean, efficient and environmentally responsible power source for electric vehicles and various other applications. In particular, the fuel cell has been identified as a potential alternative for the traditional internal-combustion engine used in modern vehicles.

One type of fuel cell is known as a proton exchange membrane (PEM) fuel cell. The PEM fuel cell typically includes three basic components: a cathode electrode, an anode electrode, and an electrolyte membrane. The cathode and anode electrodes typically include a finely divided catalyst, such as platinum, supported on carbon particles and mixed with an ionomer. The electrolyte membrane is sandwiched between the cathode and the anode to form a membrane-electrode-assembly (MEA). The MEA is often disposed between porous diffusion media (DM) which facilitate a delivery of gaseous reactants, typically hydrogen and oxygen, for an electrochemical fuel cell reaction.

Individual fuel cells can be stacked together in series to form a fuel cell stack. During start-up of the fuel cell stack, hydrogen gas is typically used to purge the anodes of air that diffuses into and accumulates on the anodes during shut-down. The flowing of hydrogen gas into the anodes after a shut-down creates a "hydrogen-air front" that travels across the anodes. The purge is desirably rapid to minimize the known carbon degradation that occurs as the hydrogen-air front moves across the anodes while air is on the cathodes. A conventional fuel cell system primarily employs the hydrogen gas pressure during the purge to displace the accumulated air. However, the rate of fill can be limited by pressure limitations of the fuel cell stack and flow resistances across the fuel cell system.

To mitigate carbon degradation, a short circuit of the fuel cell stack is sometimes performed during the purge. However, carbon corrosion may also be caused by a non-simultaneous delivery of hydrogen to the fuel cells. For example, the fuel cells nearest the hydrogen supply may receive hydrogen first, and the short circuit is not effective until most of the fuel cells have received hydrogen. Thus, the fuel cells that receive hydrogen first may experience unmitigated corrosion due to the hydrogen-air front. Additionally, when many of the fuel cells begin to receive hydrogen, the short circuit begins to operate. However, the fuel cells that do not have hydrogen may experience a negative voltage in a phenomenon known as "cell reversal." Cell reversal also results in an undesirable carbon corrosion of the fuel cell stack.

Air is also bypassed to an exhaust of a fuel cell stack during start-up to dilute exhausted purge hydrogen. Vehicle emissions standards generally require the exhausted hydrogen concentration to be less than four percent (4%) by volume. However, due to the inconsistent conditions of the fuel cell system following a shut-down period, such as a variable quantity of accumulated air on the anodes, known fuel cell systems are not particularly effective in optimizing hydrogen emissions during start-up.

There is a continuing need for a fuel cell system and method that provide an efficient start-up while meeting desired hydrogen exhaust emissions standards. Desirably, the fuel cell system and methods provide a rapid system start-up with minimal stack degradation by optimizing the hydrogen-air front time during the start-up.

SUMMARY OF THE INVENTION

In concordance with the instant disclosure, a fuel cell system and method that provide an efficient start-up that meets hydrogen exhaust emission standards and minimizes hydrogen-air front time and stack degradation, is surprisingly discovered.

In one embodiment, a fuel cell system includes a fuel cell stack having a plurality of fuel cells with anodes and cathodes. The fuel cell stack has an anode supply manifold and an anode exhaust manifold in fluid communication with the anodes. A suction device is in fluid communication with at least one of the anode supply manifold and the anode exhaust manifold. The suction device is adapted to selectively draw a partial vacuum on the fuel cell stack during a start-up of the fuel cell system.

In another embodiment, a first method for starting the fuel cell system includes the step of providing the fuel cell stack having the anode supply manifold in fluid communication with a first purge valve and an anode inlet valve adapted to selectively deliver hydrogen to the anode supply manifold. The anode exhaust manifold is in fluid communication with an anode outlet valve. A suction device in fluid communication with the first purge valve and the anode outlet valve is also provided. The first method further includes the steps of: drawing a partial vacuum on the fuel cell stack by opening at least one of the first purge valve and the anode outlet valve; closing the anode outlet valve; purging the anode supply manifold with hydrogen by opening the anode inlet valve; closing the first purge valve when the anode supply manifold is substantially filled with hydrogen; supplying the anodes and the anode exhaust manifold with hydrogen by opening the anode outlet valve; and supplying air to the cathodes. The fuel cell stack is thereby placed in an operational mode.

In a further embodiment, a second method for starting the fuel cell system includes the step of providing the fuel cell stack having the anode supply manifold in fluid communication with a first purge valve, and an anode inlet valve adapted to selectively deliver hydrogen to the anode supply manifold. The anode exhaust manifold is in fluid communication with a second purge valve and an anode outlet valve. A suction device is also provided in fluid communication with the first purge valve and the second purge valve. The second method further includes the steps of: drawing a partial vacuum on the anode supply manifold by opening the first purge valve; purging the anode supply manifold with hydrogen by opening the anode inlet valve; closing the first purge valve when the anode supply manifold is substantially filled with hydrogen; drawing a partial vacuum on the anode exhaust manifold by opening the second purge valve and the anode outlet valve, wherein hydrogen is supplied to the anodes and the anode exhaust manifold; closing the second purge valve when the anodes are substantially filled with hydrogen; and supplying air to the cathodes of the fuel cell stack. The fuel cell system is thereby placed in an operational mode.

DRAWINGS

The above, as well as other advantages of the present disclosure, will become readily apparent to those skilled in the art from the following detailed description, particularly when considered in the light of the drawings described hereafter.

DETAILED DESCRIPTION OF THE INVENTION

Figure 1:
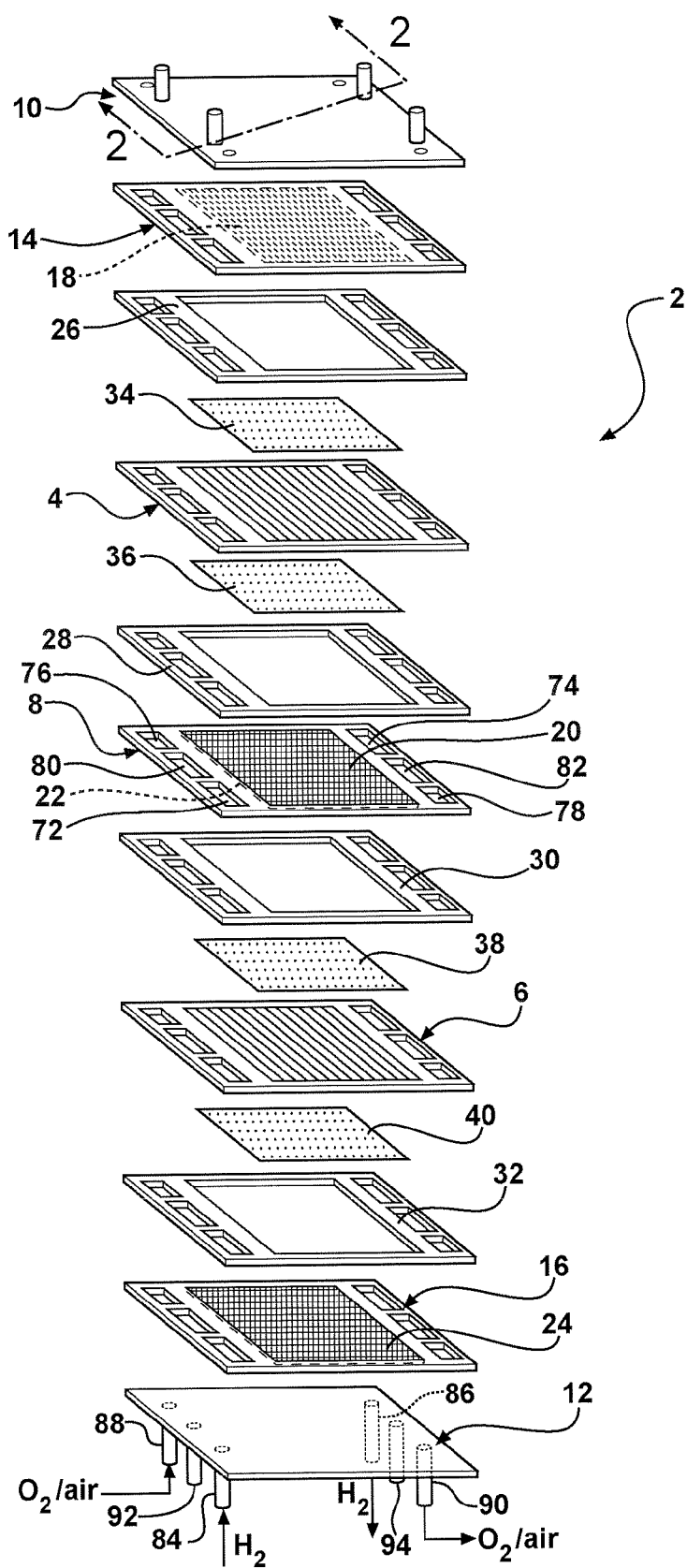
FIG. 1 illustrates a schematic, exploded perspective view of a PEM fuel cell stack of the present disclosure, showing only two cells.

The following description is merely exemplary in nature and is not intended to limit the present disclosure, application, or uses. It should also be understood that throughout the drawings, corresponding reference numerals indicate like or corresponding parts and features. In respect of the methods disclosed, the steps presented are exemplary in nature, and thus, are not necessary or critical.

FIG. 1 depicts a fuel cell stack 2 having a pair of MEAs 4, 6 separated from each other by an electrically conductive bipolar plate 8. For simplicity, only a two-cell stack (i.e. one bipolar plate) is illustrated and described in FIG. 1, it being understood that a typical fuel cell stack will have many more such cells and bipolar plates.

The MEAs 4, 6 and bipolar plate 8 are stacked together between a pair of clamping plates 10, 12 and a pair of unipolar end plates 14, 16. The clamping plates 10, 12 are electrically insulated from the end plates 14, 16 by a gasket or a dielectric coating (not shown). The unipolar end plates 14, both working faces of the bipolar plate 8, and the unipolar end plate 16 include flow fields 18, 20, 22, 24. The flow fields 18, 20, 22, 24 distribute hydrogen gas and air over an anode and a cathode, respectively, of the MEAs 4, 6.

Nonconductive gaskets 26, 28, 30, 32 provide seals and an electrical insulation between the several components of the fuel cell stack 2. Gas-permeable diffusion media 34, 36, 38, 40 abut the anodes and the cathodes of the MEAs 4, 6. The end plates 14, 16 are disposed adjacent the diffusion media 34, 40, respectively, while the bipolar plate 8 is disposed adjacent the diffusion media 36 on the anode face of MEA 4. The bipolar plate 8 is further disposed adjacent the diffusion media 38 on the cathode face of MEA 6.

The bipolar plate 8, unipolar end plates 14, 16, and the gaskets 26, 28, 30, 32 each include an anode supply aperture 72 and an anode exhaust aperture 74, a cathode supply aperture 76 and a cathode exhaust aperture 78, and a coolant supply aperture 80 and a coolant exhaust aperture 82. Supply manifolds, exhaust manifolds, and coolant manifolds of the fuel cell stack 2 are formed by an alignment of the respective apertures 72, 74, 76, 78, 80, 82 in the bipolar plate 8, unipolar end plates 14, 16, and the gaskets 26, 28, 30, 32.

The anode supply apertures 72 and the anode exhaust apertures 74 are in fluid communication with an anode inlet conduit 84 and an anode outlet conduit 86, respectively. A cathode inlet conduit 88 and a cathode outlet conduit 90 are in fluid communication with the cathode supply apertures 76 and the cathode exhaust apertures 78, respectively. The coolant supply apertures 80 and the coolant exhaust apertures 82 are in fluid communication with a coolant inlet conduit 92 and a coolant outlet conduit 94, respectively. It should be understood that the configurations of the various inlets 84, 88, 92 and outlets 86, 90, 94 in FIG. 1 are for the purpose of illustration, and other configurations may be chosen as desired.

Figure 2:
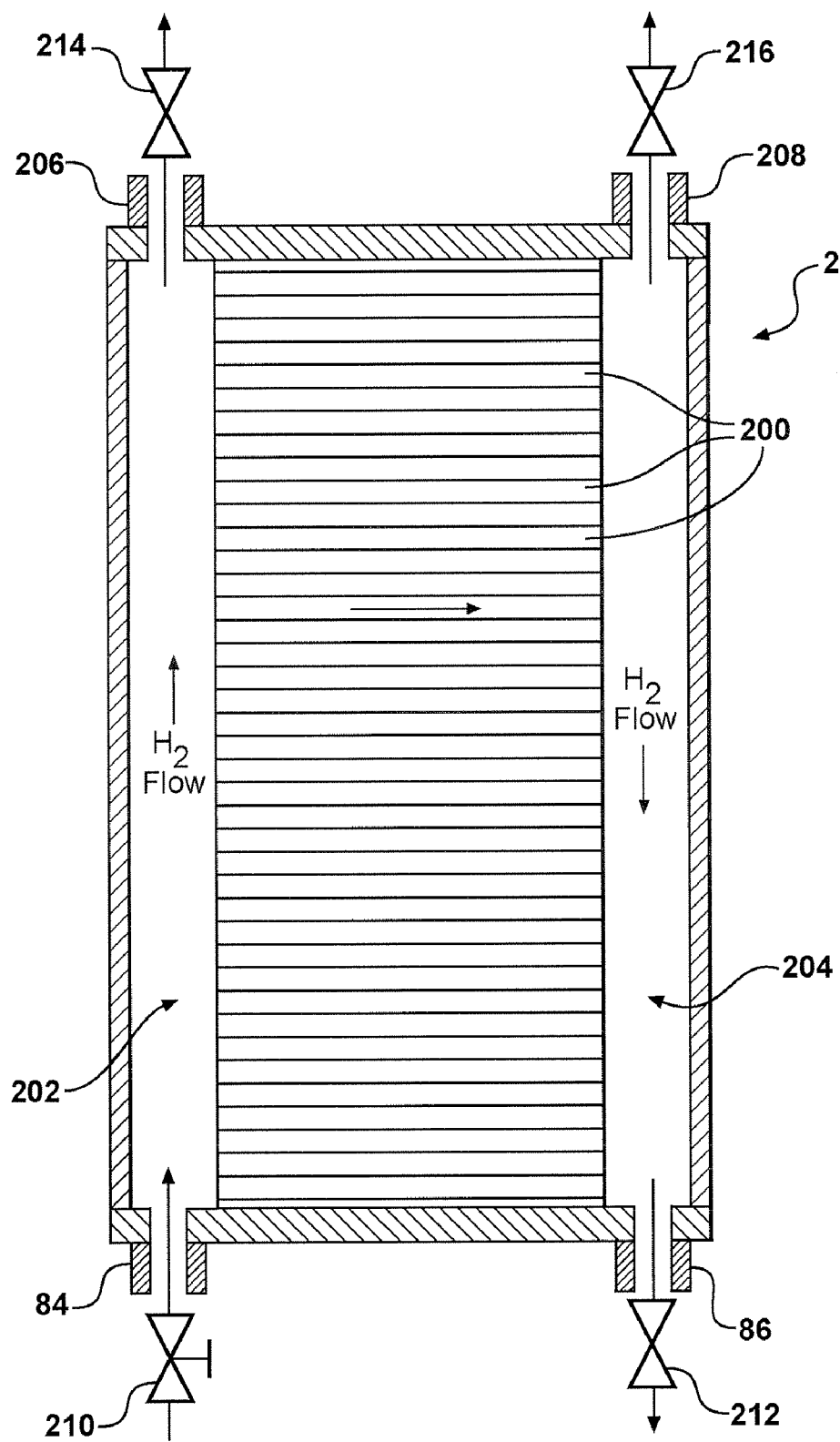
FIG. 2 is a schematic, sectional view of the fuel cell stack shown in FIG. 1, showing a plurality of fuel cells in fluid communication with an inlet valve, an outlet valve, and purge valves.

As shown in FIG. 2, the fuel cell stack 2 may include a plurality of fuel cells 200. The assembled fuel cell stack 2 has an anode supply manifold 202 and an anode exhaust manifold 204. The anode supply manifold 202 is adapted to receive a flow of hydrogen via the anode inlet conduit 84 and deliver the hydrogen to the anodes of the plurality of fuel cells 200. The anode exhaust manifold 204 is adapted to receive the flow of hydrogen from the anodes of the plurality of fuel cells 200 and deliver the hydrogen to the anode outlet conduit 86. The fuel cell stack 2 may further include at least one of a supply manifold purge conduit 206 in fluid communication with the anode supply manifold 202, and an exhaust manifold purge conduit 208 in fluid communication with the anode exhaust manifold 204.

In particular embodiments, the anode supply conduit 84 is in fluid communication with an anode inlet valve 210. An anode outlet valve 212 is in fluid communication with the anode outlet conduit 86. A first purge valve 214 is in fluid communication with the supply manifold purge conduit 206. The first purge valve 214 facilitates a purge of gases from the anode supply manifold 202 when in an open position. A second purge valve 216 may be in fluid communication with the anode exhaust manifold 204. The second purge valve 216 facilitates a purge of gases from the anode exhaust manifold when in an open position. It should be appreciated that the anode outlet valve 212, the first purge valve 214, and the second purge valve 216 may be employed, individually or in any combination, in a purge of the anodes of the fuel cell stack 2 as desired.

Figure 3:
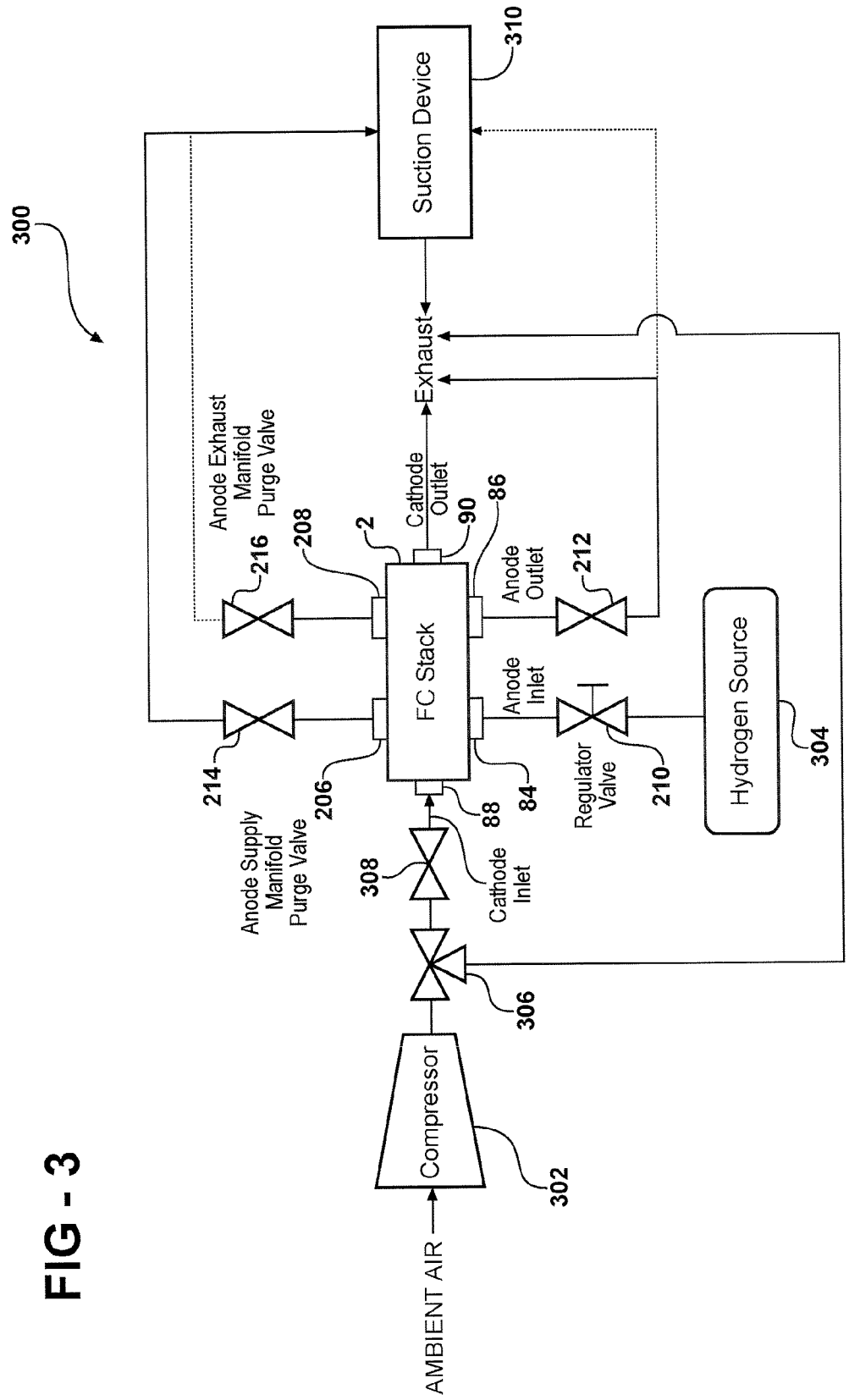
FIG. 3 is a schematic flow diagram of a fuel cell system according to an embodiment of the present disclosure, with alternative connections indicated by dashed lines.

FIG. 3 shows a fuel cell system 300 according to an embodiment of the invention. The fuel cell system 300 includes the fuel cell stack 2. The fuel cell stack 2 includes the anode inlet conduit 84 and the anode outlet conduit 86, and the cathode inlet conduit 88 and the cathode outlet conduit 90. Each of the inlet conduits 84, 88 and outlet conduits 86, 90 is in fluid communication with the respective anodes and cathodes of the plurality of fuel cells 200. In a particular embodiment, the fuel cell stack 2 is connected to an electrical load, such as an electrical drive motor (not shown) of an electric vehicle.

The fuel cell system 300 includes an air compressor 302 in fluid communication with the cathode inlet conduit 88. The air compressor 302 is adapted to receive air, for example, from the ambient atmosphere and supply the air to the cathodes of the fuel cell stack 2. The fuel cell system 300 also includes a hydrogen source 304 configured to supply hydrogen gas to the anodes of the fuel cell stack 2. As a nonlimiting example, the hydrogen source 304 may be a high-pressure storage vessel with compressed hydrogen gas. It should be understood that other suitable hydrogen sources 304 may be employed as desired.

The anode inlet valve 210 is disposed between the hydrogen source 304 and the anode inlet 84 of the fuel cell stack 2. The anode inlet valve 210 is adapted to selectively supply hydrogen from the hydrogen source 304 to the anodes of the fuel cell stack 2.

The fuel cell system 300 further includes a bypass valve 306 disposed between the air compressor 302 and the fuel cell stack 2. The bypass valve 306 is adapted to selectively direct a flow of the air from the air compressor 302 around the fuel cell stack 2. In one embodiment, the bypass valve 306 directs the flow of air from the air compressor 302 to an exhaust. The air intermixes with and dilutes residual hydrogen and products exhausted from the anodes of the fuel cell stack 2.

An air supply valve 308 may be provided in fluid communication with the air compressor 302 and the fuel cell stack 2. The air supply valve 308 may be employed in addition to the bypass valve 306 for purpose of controlling the air flow to the fuel cell stack 2. For example, the bypass valve 306 and the air supply valve 308 may be transitioned to militate against excess hydrogen emissions. It should be appreciated that while the fuel cell stack 2 is being filled, hydrogen can move through the polymer electrolyte membrane to the cathodes, for example, via diffusion and electrochemical pumping. Upon flowing air to the fuel cell stack 2, the hydrogen in the cathodes is forced out to the exhaust. By overlapping the opening and closing of the bypass valve 306 and the air supply valve 308, a quantity of air may be provided to the exhaust of the fuel cell stack 2 sufficient to dilute the hydrogen exiting the cathodes during the filling of the cathodes with air.

In a particular embodiment of the present disclosure, the fuel cell system 300 includes a suction device 310. The suction device 310 is in fluid communication with at least one of the anode supply manifold 202 and the anode exhaust manifold 204 of the fuel cell stack 2. The suction device 310 is adapted to selectively draw at least a partial vacuum on the fuel cell stack 2 during a start-up operation of the fuel cell system 300. The suction device 310 creates a vacuum below the ambient pressure which assists the filling of the fuel cell stack 2 with hydrogen. For example, the suction device 310 may provide a vacuum of at least about 5 kPa lower than ambient pressure. In another nonlimiting example, the suction device 310 provides a vacuum of up to about 40 kPa lower than ambient pressure. It should be appreciated that other suitable vacuums may be employed as desired.

The suction device 310 may be adapted to selectively draw a partial vacuum on at least one of the anode supply manifold 202 and the anode exhaust manifold 204, for example. The suction device 310 may also be adapted to selectively draw the partial vacuum on the fuel cell stack 2 as a whole, i.e., a simultaneous drawing of a partial vacuum on the anodes and both the anode supply manifold 202 and the anode exhaust manifold 204. The suction device 310 is particularly adapted to assist a purging of the manifolds and filling of the anodes of the fuel cell stack 2 with hydrogen during the start-up operation.

The suction device 310 is in fluid communication with at least one of the anode outlet valve 212, the first purge valve 214, and the second purge valve 216. It should be understood that, when one of the anode outlet valve 212, the first purge valve 214, and the second purge valve 216 are in an open position, the suction device 310 may draw a partial vacuum on the fuel cell stack 2. Likewise, when all of the first purge valve 214, the second purge valve 216, and the anode outlet valve 212 in communication with the suction device 310 are in a closed position, the suction device 310 is unable to draw the partial vacuum on the fuel cell stack 2. Thus, the actuation of the valves 212, 214, 216 is employed to selectively draw the partial vacuum on the fuel cell stack 2.

As a nonlimiting example, when hydrogen is being supplied via the anode inlet valve 210, the first purge valve 214 is in an open position, and the other valves 212, 216 (if present) are closed, the partial vacuum may be drawn substantially exclusively on the anode supply manifold 202. As a further nonlimiting example, when the first purge valve 214 and the anode outlet valve 212 are in open positions, the partial vacuum may be drawn on the fuel cell stack 2 as a whole, including the anode supply manifold 202, the anode exhaust manifold 204, and the anodes of the plurality of fuel cells 200.

The fuel cell system 300 of the present disclosure may further have at least one stack shorting device (not shown) in electrical communication with the fuel cell stack 2. In particular embodiments, the stack shorting device is a resistor. The stack shorting device is adapted to place a resistive load on the fuel cell stack 2 during start-up, thereby militating against fuel cell degradation induced by carbon corrosion. A suitable stack shorting device is described in assignee's co-pending U.S. application Ser. No. 11/684,302, incorporated herein by reference in its entirety. Other suitable stack shorting devices may be used as desired.

An anode recycle pump (not shown) may also be employed in the fuel cell system 300. One suitable anode recycle pump is described in assignee's co-pending U.S. application Ser. No. 11/671,017, incorporated herein by reference in its entirety. The anode recycle pump may be in fluid communication with the anode supply manifold 202 and the anode exhaust manifold 204. The anode recycle pump is adapted to recycle residual hydrogen exhausted from the fuel cell stack 2 in operation. The anode recycle pump delivers the residual hydrogen back to the anode supply manifold 202 where it may be used in the fuel cell stack 2 electrochemical reactions.

The fuel cell system 300 may also have an anode bleed valve (not shown) configured to discharge accumulated nitrogen in the fuel cell stack 2. The nitrogen may accumulate, for example, due to polymer electrolyte membrane crossover by the cathode air and a recycling of the anode exhaust with residual hydrogen to the anode supply manifold 202 via the anode recycle pump. In particular embodiments, at least one of the anode outlet valve 212, the first purge valve 214, and the second purge valve 216 may be employed as the anode bleed valve.

The fuel cell system 300 may employ other fuel cell system components known in the art. For example, the fuel cell system may include at least one of a humidity sensor, a voltage sensor, a pressure sensor, a water vapor transfer device, a controller, a back-pressure valve, and a charge-air cooler, for example. In a particular embodiment, the fuel cell system 300 includes a plurality of similarly configured fuel cell stacks 2.

Figure 4:
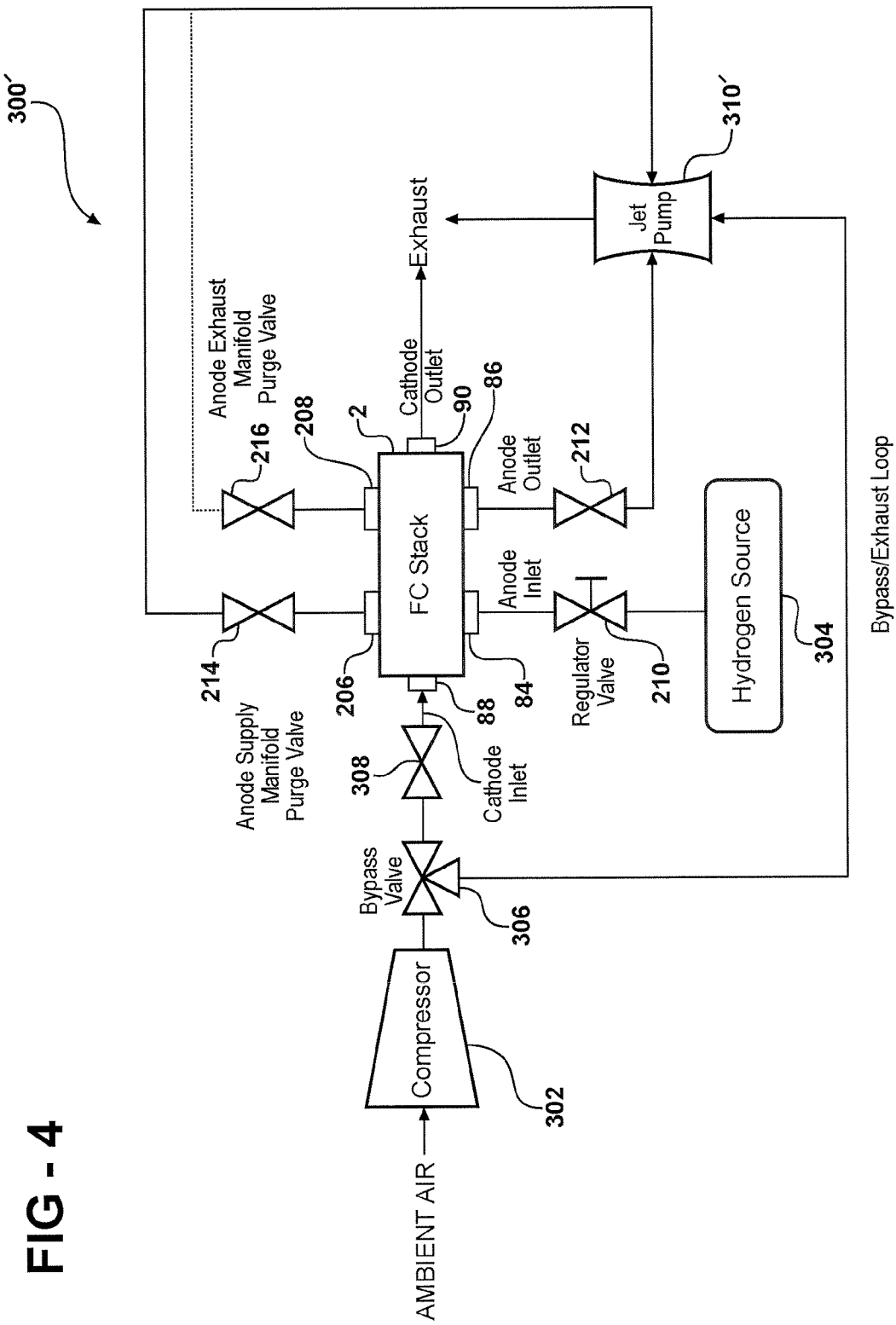
FIG. 4 is a schematic flow diagram of the fuel cell system shown in FIG. 3, having an eductor adapted to assist an anode purge of the fuel cell system, with alternative connections indicated by dashed lines.
Figure 5:
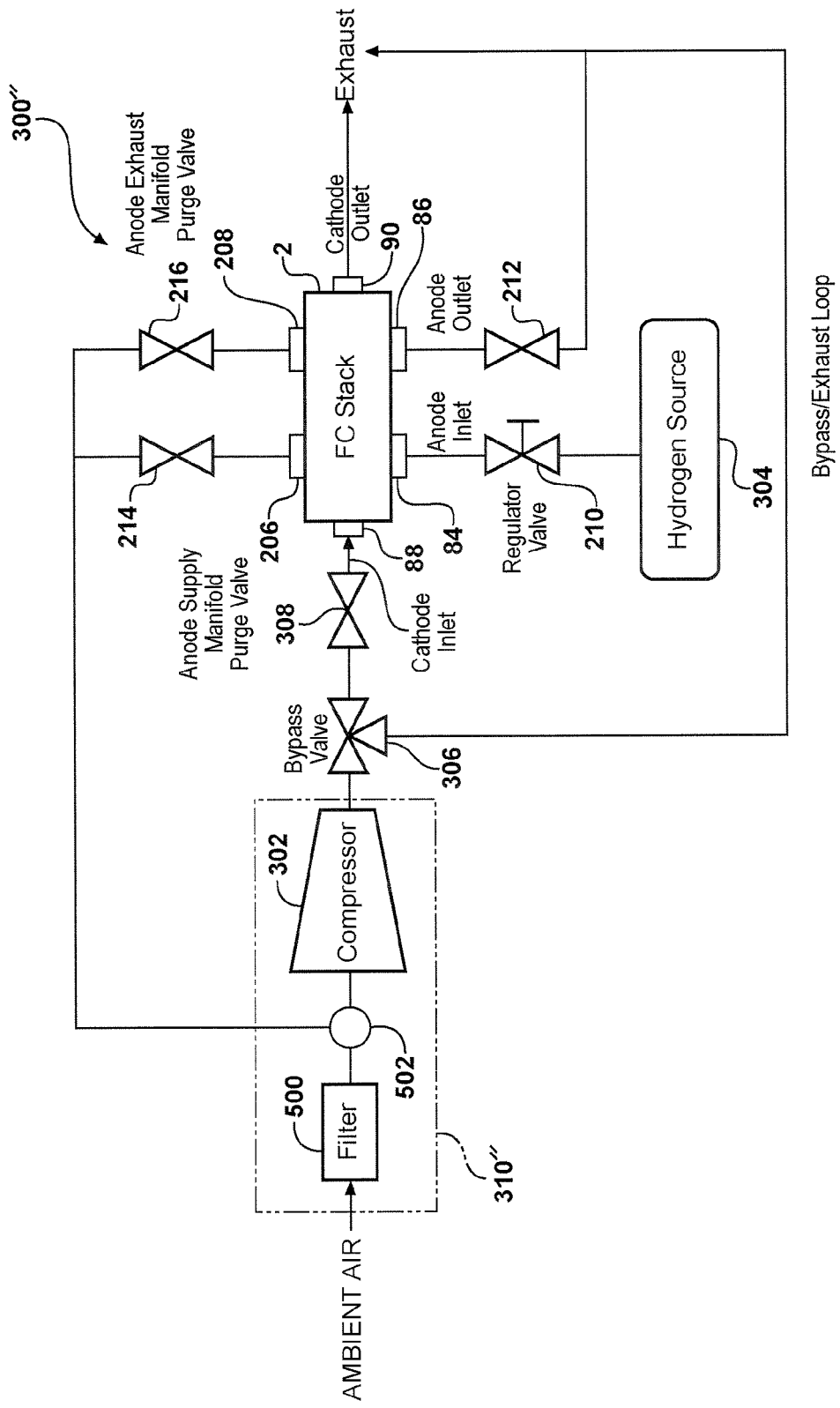
FIG. 5 is a schematic flow diagram of the fuel cell system shown in FIG. 3, having an air compressor and flow restrictor adapted to assist an anode purge of the fuel cell system.

Further embodiments of the fuel cell system 300 are shown in FIGS. 4 and 5. Like or related structures repeated from FIGS. 1 to 3 include the same reference numerals with a prime symbol (') or double-prime symbol (").

In one embodiment depicted in FIG. 4, the suction device 310' of the fuel cell system 300' is an eductor such as a jet pump, venturi nozzle, or aspirator, for example. The suction device 310' has a motive port, a discharge port, and a suction port. The suction device 310' is configured to receive a motive flow of a fluid, such as an air stream, through the motive and discharge ports and create suction at the suction port. The suction is capable of drawing a partial vacuum on the fuel cell stack 2 as desired.

The motive port of the suction device 310' is in fluid communication with a motive flow generator, such as the air compressor 302 that is used to supply air to the fuel cell stack 2 while in operation. The motive flow generator may be a second air compressor, however. It should be appreciated that other suitable motive flow generators may also be employed.

In one particular example, the motive port of the suction device 310' is in fluid communication with the bypass valve 306 and the air compressor 302. When the bypass valve 306 is configured to bypass a flow of air around the fuel cell stack 2, such as during the start-up operation, the air flow is directed through the motive port of the suction device 310'. The air flow provides the motive force that enables suction at the suction port. The air flow is then directed out of the discharge port, along with gases drawn in at the suction port, to the exhaust of the fuel cell system 300'.

A skilled artisan should understand that the suction device 310' may be adapted to provide a ratio of suction hydrogen flow to motive air flow such that the concentration of hydrogen being discharged from the suction device 310' is less than a lower flammability limit (LFL) of hydrogen in air. In a particular embodiment, the suction device 310' provides a ratio of hydrogen flow to motive air flow that results in an exhausted hydrogen concentration of less than about four percent (4%) by volume.

As shown in FIG. 5, the suction device 310" of the fuel cell system 300" includes the air compressor 302 and a flow restrictor 500, such as an air filter configured to inhibit a flow of air being drawn therethrough by the air compressor 302. Other suitable flow restrictors 500 may be employed as desired, such as a flow-restricting valve, for example. The air compressor 302 is in fluid communication with the flow restrictor 500. A reduced pressure zone 502 is formed between the flow restrictor 500 and the air compressor 302 during operation of the air compressor 302 at start-up. It should be appreciated that, as the flow restrictor 500 militates against a flowing of air into the air compressor 302, a depressed pressure may be produced that is sufficient to draw a partial vacuum on the fuel cell stack 2. The fuel cell system 300" includes the bypass valve 306 adapted to selectively direct the flow of the air from the air compressor 302 around the fuel cell stack 2 and to an exhaust, for example.

The present disclosure includes a first method of starting the fuel cell system 300. The method includes the step of providing the fuel cell system 300. For example, the fuel cell system 300 may have the fuel cell stack 2 with the anode supply manifold 202 and the anode exhaust manifold 204 in fluid communication with the anodes. The anode supply manifold 202 of the fuel cell stack 2 is in fluid communication with an anode inlet valve adapted to selectively deliver hydrogen from the hydrogen source 304 to the anode supply manifold. The anode supply manifold 202 is also in fluid communication with the first purge valve 214. The anode exhaust manifold 204 is in fluid communication with the anode outlet valve 212. The provided fuel cell system 300 further includes the suction device 310 in fluid communication with the first purge valve 214 and the anode outlet valve 212. The suction device 310 is adapted to draw the partial vacuum on the fuel cell stack 2 as desired.

According to the first method, at least one of the anode outlet valve 212 and the first purge valve 214 are opened. In a particular embodiment, both the anode outlet valve 212 and the first purge valve 214 are opened concurrently. In opening at least one of the anode outlet valve 212 and the first purge valve 214 in fluid communication with the suction device, the partial vacuum is drawn on the fuel cell stack 2 as a whole. It should be appreciated that opening both the anode outlet valve 212 and the first purge valve 214 militates against a pulling of gases from one of the anode supply manifold 202 and the anode exhaust manifold 204 into the anodes of the fuel cells 200. Thus, a traveling of hydrogen-air fronts across the anodes is militated against by initially drawing the partial vacuum on both the anode supply manifold 202 and the anode exhaust manifold 204 sides of the fuel cell stack 2.

The method next includes a step of closing the anode outlet valve 212. The anode inlet valve 210 is then opened, resulting in a purging of the anode supply manifold 202. During the purge step, it should be appreciated that hydrogen may be supplied through the anode inlet valve 210 at a flow rate that militates against a flow of hydrogen into the anodes of the fuel cells 200. For example, the hydrogen is supplied at a rate sufficient to maintain the internal vacuum on the fuel cell stack 2. The internal vacuum on the fuel cell stack may be substantially equal to the vacuum established prior to introduction of hydrogen via the anode inlet valve 210. The hydrogen is drawn through the anode supply manifold 202 and the first purge valve 214 in communication with the suction device 310, thereby militating against any substantial migration of the hydrogen into the anodes of the fuel cell stack 2. The duration of the purge step is a time adequate to substantially fill the anode supply manifold 202 with the hydrogen gas.

Following the purging of the anode supply manifold 202, the first purge valve 214 is closed and the anode outlet valve 212 is opened. The anodes of the fuel cells 200 and the anode exhaust manifold 204 are then purged with hydrogen in a "stack fill" step. The flow rate of the hydrogen may be increased upon opening the anode outlet valve 212 to facilitate a rapid fill of the anodes and the anode exhaust manifold 204. It should be understood that the filling of the anodes and the anode exhaust manifold 204 is assisted during this step by the drawing of the partial vacuum at the anode outlet valve 212. The duration of the stack fill step is a time sufficient to substantially fill the anodes of the fuel cells 200 with hydrogen.

To complete the start-up of the fuel cell system 300, air is supplied to the cathodes of the fuel cells 200. For example, the air is supplied by the air compressor 302. In the step of supplying air to the cathodes, at least one of the bypass valve 306 and air supply valve 308 may be adapted to divert air to the cathode inlet conduit 88 of the fuel cell stack 2.

With renewed reference to FIG. 4, the first method may employ the suction device 310', such as the eductor having the motive port, the discharge port, and the suction port. The suction port may be in fluid communication with at least one of the anode outlet valve 212 and the first purge valve 214. The air compressor 302 may also be provided in fluid communication with the motive port of the suction device 310'. In operation, the method therefore includes the step of starting the air compressor 302 to provide the motive air flow to the suction device 310'. The air compressor 302 is started prior to the drawing of the partial vacuum on the fuel cell stack 2, so that the suction device 310' may generate suction sufficient to draw the partial vacuum.

The method may further include the steps of providing the stack shorting device in electrical communication with the fuel cell stack 2. The stack shorting device is engaged before the filling of the anodes with hydrogen. An electrical load is thereby applied to the fuel cell stack 2 that militates against carbon corrosion of the fuel cell stack 2 while the anodes are filled with hydrogen. After the anodes are substantially filled with hydrogen, the stack shorting device may be disengaged.

A skilled artisan should understand that a partial vacuum is typically created within the anodes of the fuel cell stack 2 during a conventional shut-down. As hydrogen is consumed without replenishment, the anode gases cool and water vapor condenses, resulting in a sub-ambient pressure on the anodes, the anode supply manifold 202, and the anode exhaust manifold 204. Thus, in conventional systems, the opening of the anode outlet valve 212 allows a back-flow of air from the atmosphere into the anodes having the sub-ambient pressure. The backflow creates an undesirable hydrogen-air front that may result in carbon corrosion and a degradation of performance. The fuel cell system 300, 300' and the first method of the disclosure militates against a back-flow of air into the fuel cell stack 2 by filling the anodes with hydrogen.

The present disclosure also includes a second method for starting the fuel cell system 300. The second method also includes the step of providing the fuel cell system 300. For example, the fuel cell stack 2 includes the anode supply manifold 202 in fluid communication with the anode inlet valve 210 and the first purge valve 214. In contrast with the first method, however, the anode exhaust manifold 204 is in fluid communication with the anode outlet valve 212 and the second purge valve 216. The suction device 310 is also provided in fluid communication with the first purge valve 214 and the second purge valve 216 and adapted to draw a vacuum on the fuel cell stack 2 as desired.

According to the second method, the suction device 310 draws the vacuum substantially exclusively on the anode supply manifold 202 when the first purge valve 214 is opened. In operation, a purge step follows the drawing of the partial vacuum on the anode supply manifold 202. In the purge step, the anode inlet valve 210 is opened and the anode supply manifold 202 is substantially filled with hydrogen. After the anode supply manifold 202 is substantially filled with hydrogen, the first purge valve 214 is closed.

The method next includes the step of drawing the partial vacuum on the anode exhaust manifold 204 by opening the anode outlet valve 212 and the second purge valve 216. The opening of the valves 212, 216 may be performed substantially simultaneous with the closing of the first purge valve 214. As the anode inlet valve 210 is already opened, the opening of valves 212, 216 allows the hydrogen to purge the anodes and the anode exhaust manifold 204 in the stack fill step. The opening of both the anode outlet valve 212 and the second purge valve 216, both in fluid communication with the suction device 310, facilitates a rapid fill of the anodes and the anode exhaust manifold 204 with hydrogen. In particular, opening up both valves 212, 216 minimizes a resistance to flow of hydrogen through the anodes and the anode exhaust manifold 204. The second purge valve 216 is closed when the anodes are substantially filled with hydrogen, for example.

As with the first method described herein, the start-up of the fuel cell system 300 according to the second method is completed when air is supplied to the cathodes of the fuel cell stack 2. With both hydrogen flowing to the anodes and air flowing to the cathodes, the fuel cell system 300 is placed in an operational mode.

With renewed reference to FIG. 5, the second method may employ the fuel cell system 300" having the suction device 310", e.g., the air compressor 302 in fluid communication with the flow restrictor 500 and have a reduced pressure zone 502 disposed therebetween. In this configuration, the first purge valve 214 and the second purge valve 216 are in fluid communication with the reduced pressure zone 502. When the second method employs the suction device 310", the method includes the step of starting the air compressor prior to the step of drawing the partial vacuum on the anode supply manifold 202. The vacuum is thereby generated in the reduced pressure zone 502 that is sufficient to draw the partial vacuum on the fuel cell stack 2.

It should be understood that the fuel cell system 300, 300', 300" and methods described herein employ the selective drawing of the partial vacuum to pull air from the anodes of the fuel cell stack 2 that has accumulated during shut-down of the fuel cell system. Thus, the purging and filling of the anodes with hydrogen is assisted by the drawing of the partial vacuum on the fuel cell stack 2. A pressure of hydrogen sufficient to displace the accumulated air is thereby reduced, particularly because the partial vacuum assists by pulling the accumulated air from the fuel cell stack 2.

One of ordinary skill should understand that the fuel cell system 300, 300', 300" and methods of the disclosure militate against a flow of hydrogen into the anodes of the plurality of fuel cells 200 during the purging of the anode supply manifold 202. For example, the partial vacuum drawn on the anode supply manifold 202 before the hydrogen purge step allows for a rapid fill without exceeding a pressure where the hydrogen is forced into the anodes of the fuel cell stack 2.

The assisted purging and filling of the fuel cell stack 2 with hydrogen via the drawing of the partial vacuum on at least one of the anode supply manifold 202 and the anode exhaust manifold 204 also facilitate a rapid and reliable start-up. The fuel cell system 300, 300', 300" and methods result in a substantially even distribution of hydrogen throughout the fuel cell stack 2 anodes. As the hydrogen-air front moves rapidly as a "fast front" in response to both hydrogen pressure and the partial vacuum drawn on the fuel cell stack 2, cell reversals, negative cell voltages, and carbon corrosion are militated against. A durability of the fuel cell stack 2 is thereby optimized.

The fuel cell system 300, 300', 300" and methods of the disclosure also minimize hydrogen emissions. For example, due to the assisting of the anode purge and fill of the fuel cell stack 2 with the partial vacuum being drawn thereon, the pressure of hydrogen supplied to the fuel cell stack 2 may be reduced. Conventional fuel cell systems rely on the pressure of hydrogen to displace a combination of accumulated air and residual hydrogen of unknown composition. The partial vacuum drawn on the fuel cell stack 2 enables the employment of less hydrogen to displace the gases present after shut-down. Supplying a sufficient quantity of hydrogen for fuel cell stack 2 operations, while not exceeding an amount that results in exhaust emission greater than about four percent by volume, is thereby facilitated with the present fuel cell system 300, 300', 300" and methods.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for starting a fuel cell system, the method comprising the steps of:
    providing a fuel cell stack with a plurality of fuel cells having anodes and cathodes, the fuel cell stack having an anode supply manifold and an anode exhaust manifold in fluid communication with the anodes, the anode supply manifold in fluid communication with a first purge valve and a regulator valve adapted to selectively deliver hydrogen to the anode supply manifold, the anode exhaust manifold in fluid communication with an anode outlet valve;
    providing a suction device in fluid communication with the first purge valve and the anode outlet valve;
    drawing a partial vacuum on the fuel cell stack by opening the first purge valve and the anode outlet valve;
    closing the anode outlet valve;
    purging the anode supply manifold with hydrogen by opening the regulator valve;
    closing the first purge valve when the anode supply manifold is substantially filled with hydrogen;
    supplying the anodes and the anode exhaust manifold with hydrogen by opening the anode outlet valve; and supplying air to the cathodes, wherein the fuel cell stack is placed in an operational mode.

2. The method of claim 1, wherein the suction device is an eductor having a motive port, a discharge port, and a suction port, the suction port in fluid communication with at least one of the first purge valve and the anode outlet valve.

3. The method of claim 2, further comprising the steps of:
providing an air compressor in fluid communication with the motive port of the eductor; and
starting the air compressor prior to the step of drawing a partial vacuum on the fuel cell stack, wherein a motive air flow is provided to the eductor.

4. The method of claim 3, wherein the regulator valve supplies hydrogen at a flow rate that militates against a flow of hydrogen into the anodes during the step of purging the anode supply manifold.

5. The method of claim 3, wherein a ratio of a hydrogen flow to the motive air flow results in an exhausted hydrogen concentration of less than about 4 percent by volume.

6. The method of claim 3, further comprising the steps of:
providing a stack shorting device in electrical communication with the fuel cell stack;
engaging the stack shorting device before the filling of the anodes with hydrogen, wherein an electrical load is applied on the fuel cell stack; and
disengaging the stack shorting device after the anodes are substantially filled with hydrogen.

7. The method of claim 1, further comprising the steps of:
providing an anode recycle pump in fluid communication with the anode supply manifold and the anode exhaust manifold, the anode recycle pump adapted to recycle residual hydrogen exhausted from the fuel cell stack;
causing hydrogen to flow from the anode exhaust manifold around the anode recycle pump before the filling of the anodes with hydrogen;
filling the anode recycle pump with hydrogen; and
supplying hydrogen from the anode exhaust manifold to the recycle pump after the anodes and the anode exhaust manifold are substantially filled with hydrogen.

8. A method for starting a fuel cell system, the method comprising the steps of:
providing a fuel cell stack with a plurality of fuel cells having anodes and cathodes, the fuel cell stack having an anode supply manifold and an anode exhaust manifold in fluid communication with the anodes, the anode supply manifold in fluid communication with a first purge valve and a regulator valve adapted to selectively deliver hydrogen to the anode supply manifold, the anode exhaust manifold in fluid communication with a second purge valve and an anode outlet valve;
providing a suction device in fluid communication with the first purge valve and the second purge valve;
drawing a partial vacuum on the anode supply manifold by opening the first purge valve;
purging the anode supply manifold with hydrogen by opening the regulator valve;
closing the first purge valve when the anode supply manifold is substantially filled with hydrogen;
drawing a partial vacuum on the anode exhaust manifold by opening the second purge valve and the anode outlet valve, wherein hydrogen is supplied to the anodes and the anode exhaust manifold;
closing the second purge valve when the anodes are substantially filled with hydrogen; and
supplying air to the cathodes, wherein the fuel cell system is placed in an operational mode.

9. The method of claim 8, wherein the suction device is an air compressor in fluid communication with a flow restrictor and having a reduced pressure zone disposed therebetween, the reduced pressure zone in fluid communication with the first purge valve and the second purge valve.

10. The method of claim 9, further comprising the step of starting the air compressor prior to the step of drawing a partial vacuum on the anode supply manifold, wherein suction is generated in the reduced pressure zone.

* * * * *